United States Patent Office
2,831,859
Patented Apr. 22, 1958

2,831,859

DIARYL AND ARYLTHIENYL ALKYL-AMINES AND PROCESS FOR PREPARING THE SAME

Karl Kindler, Wentorf, and Werner Hansen, Hamburg-Volksdorf, Germany, assignors to Chemische Fabrik Promonta G. m. b. H., Hamburg, Germany No Drawing. Application June 1, 1955
Serial No. 512,576

Claims priority, application Germany June 5, 1954

9 Claims. (Cl. 260—247.1)

This invention relates to novel derivatives of phenylalkylamines and has particular relation to compounds of this type, which contain a carbon chain including at least two C-atoms between the phenyl and the amino group and contain, as a ligand, an unsubstituted or substituted benzyl radical or thenyl radical in the benzene radical of the compound. The invention also relates to a process for the preparation of said novel derivatives.

The compounds embodying the present invention correspond to the general formula

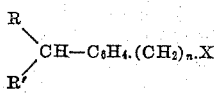

wherein R stands for an aryl or thienyl radical, R' stands for H or alkyl, X stands for the amine radical and $n$ is an integer and meets the condition $n>1$.

The compounds according to the invention can be used for therapeutic applications, for example for local anesthesia.

In carrying out the present invention a phenylalkyl halogenide, particularly a phenyl alkyl chloride of the formula $C_6H_5$—$(CH_2)_n$.Cl is used as starting material and a hydrogen atom of the phenyl group is substituted by a benzyl radical or thenyl radical. Subsequently, the Cl atom is substituted according to conventional methods by an amine radical.

Substitution of the H atom can be effected according to two procedures. According to a first procedure, the phenylalkyl chloride is reacted in the presence of a suitable catalyst, e. g. an iron compound, such as $FeCl_3$ or $Fe_2O_3$, with a halogenide, preferably a chloride, of the general formula

in order to form a compound of the formula

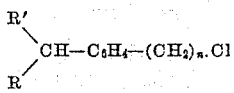

wherein the symbols R, R' and $n$ have the meaning defined above. Subsequently the Cl atom of the compound formed is exchanged by an amine radical, in conventional manner. According to the second procedure, the chloride $C_6H_5$—$(CH_2)_n$.Cl is first subjected to chloromethylation. The dichloride thus obtained, which has the formula $Cl.CH_2$—$C_6H_4$—$(CH_2)_n$.Cl, is reacted in the presence of suitable catalysts, e. g. iron compounds, with a compound of the formula R.H (in which R stands for an aryl or thienyl radical) to form a compound of the formula $R.CH_2$—$C_6H_4$—$(CH_2)_n$.Cl. Finally, the Cl atom of the latter is exchanged in conventional manner with an amine radical.

Thus, the chlorides are reacted in the presence of suitable iron compounds, e. g. $FeCl_3$ or $Fe_2O_3$, for example with benzyl chloride. Thereby HCl is split off and a benzyl phenylalkyl chloride is formed, in which the Cl atom is exchanged in conventional manner with a basic radical, for example according to the following scheme:

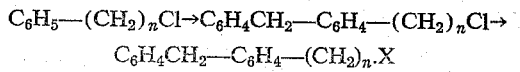

$$C_6H_4CH_2-C_6H_4-(CH_2)_n.X$$

wherein X is the amine radical and $n>1$.

Instead of benzyl chloride, its derivatives can be used, in which the side chain contains alkyl radicals, e. g. a methyl radical, or the benzene radical is substituted e. g. by F, Cl, Br or a methoxy radical. Thenyl chloride and its derivatives, e. g. 5-chlorothenyl chloride can also be substituted for benzyl chloride.

The same products can be likewise obtained by the following reactions:

A phenylalkyl chloride, the alkyl of which contains a chain including at least two C-atoms, is subjected to chloromethylation and the resulting dichloride is reacted, in the presence of suitable iron compounds as catalyst, with an aromatic compound, such as anisol, o-chloroanisol, o-butoxytoluene, diphenyl ether, naphthalene, 1,2,3,4-tetrahydronaphthalene or thiophene or its derivatives, e. g. 2-chlorothiophene. Thereby an H atom of these compounds (RH) reacts with the Cl atom of the chloromethyl radical with the formation of HCl:

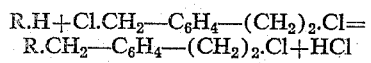

In the monochloride thus obtained, the Cl atom is substituted again in conventional manner by an amine radical.

In carrying out the process of this invention it is essential that the catalysts, which may also be compounds of other metals, e. g. compounds of aluminum, be used in minimum amounts.

The following examples show some embodiments of and best modes of carrying out the invention, to which the invention is not limited.

EXAMPLE 1

N-(p-benzylphenylpropyl)-piperidine

To 46 parts of γ-phenylpropyl chloride 0.022 part of anhydrous $FeCl_3$ or $Fe_2O_3$, are added. Into this mixture, 12.7 parts benzyl chloride are slowly introduced, e. g. by adding drop by drop, under heating to about 100° C. and passing dry air through the mixture. The reaction is completed as soon as the formation of HCl ceases. After cooling, the reaction mass is diluted with some ether or benzene and is washed successively with hydrochloric acid, sodium bicarbonate solution and water. Subsequently, the excess of phenylpropyl chloride is removed by distillation under reduced pressure and the residue is reacted with about an equal amount of piperidine at 125° C. The hydrochloric acid solution of the reaction product is washed with ether or benzene and is then rendered alkaline with KOH, whereby, in addition to the unchanged piperidine, the desired piperidine derivative is likewise separated. After the conventional separation, the mixture of the amines is subjected to fractional distillation. Thereby, in addition to unchanged piperidine, pure N-(p-benzyl phenyl propyl)-piperidine having a boiling point of $b_3$ 201° C. is obtained. The yield amounts to 65% if the theory, based on the reacted amount of γ-phenylpropyl chloride.

EXAMPLE 2

N-[p-(4-chlorobenzyl)-phenylpropyl]-piperidine 46 parts of γ-phenylpropyl chloride are reacted in the manner described in the above Example 1, in the presence of 0.022 part of $FeCl_3$ as catalyst, with 16 parts of 4-chlorobenzyl chloride. Thereby, the full theoretical amount of HCl is split off already within 15 minutes. The reaction product is further treated in the manner described in Example 1 and then reacted with piperidine. In the purification of the piperidine derivative formed, the desired amine which boils at a pressure of 3 Torr. at 223°–224° C., is obtained in a yield of 65% of the theory, based (like in all other examples) on the reacted amount of γ-phenylpropyl chloride.

EXAMPLE 3

N-(p-benzylphenylpropyl)-morpholine

In preparing this compound, all steps are carried out in the manner described in Example 1, but the piperidine is replaced by an equal amount of morpholine. The N-(p-benzylphenylpropyl)-morpholine thus prepared has a boiling point of $b_2$ 201° C. and the yield amounts to 63%.

EXAMPLE 4

N-[p-(4-chlorobenzyl)-phenylpropyl]-morpholine

If in the reaction described in the above Example 2, the piperidine is replaced by an equal amount of morpholine, the compound N-[p-(4-chlorobenzyl)-phenylpropyl]-morpholine having a boiling temperature of $b_2$ 218°–220° C. is obtained. The yield amounts to about 70%.

EXAMPLE 5

N-[p-(4-chlorobenzyl)-phenylethyl]-piperidine 42 parts of β-phenylethyl chloride, 16 parts of 4-chlorobenzyl chloride are reacted in the presence of 0.015 part of $FeCl_3$ according to the procedure described in the above Example 1. The crude product of this reaction is caused to react, at 125° C., after distilling off the unchanged phenylethyl chloride, with about an equal amount of piperidine. By further treatment according to conventional procedure, pure N-[p-(4-chlorobenzyl)-phenylethyl]-piperidine having a boiling point of $b_2$ 204°–205° C. is obtained in good yield.

EXAMPLE 6

N-[p-(4-chlorobenzyl-phenylethyl]-morpholine

This compound is obtained in good yield by substituting morpholine in the procedure described in Example 5. Boiling point: $b_3$ 224°–225° C.

EXAMPLE 7

N-[p-(α-phenylethyl)-phenylethyl]-piperidine

In order to prepare this compound, 168 parts of β-phenylethyl chloride and 56 parts of α-phenylethyl chloride are reacted in the presence of 0.05 part of $FeCl_3$. The crude product formed and processed in conventional manner is reacted with an equal amount of piperidine and yields N-[p-(α-phenylethyl)-phenylethyl]-piperidine having a boiling point of $b_3$ 200–201° C.

EXAMPLE 8

N-[p-(α-phenylethyl)-phenylethyl]-morpholine

This compound is formed if in the reaction described in the preceding Example 7 the piperidine is replaced by an equal amount of morpholine. The boiling point of the compound is $b_4$ 218°–219° C.

EXAMPLE 9

N-[p-methoxy-m-(5-chlorothenyl)-γ-phenylisobutyl]-piperidine 119 parts of γ-(p-methoxyphenyl)-isobutyl chloride are reacted with 33 parts of 5-chlorothenyl chloride in the presence of 0.015 part of $FeCl_3$, in the manner described in the above Example 1. The intermediate product thus formed is reacted with an equal amount of piperidine, whereby the compound N-[p-methoxy-m-(5-chlorothenyl)-γ-phenylisobutyl]-piperidine having a boiling point of $b_2$ 222°–224° C. is formed with good yield.

EXAMPLE 10

N-[p-methoxy-m(5-chlorothenyl)-γ-phenylisobutyl]-morpholine

This compound is prepared by substituting in the procedure of the preceding Example 9, an equal amount of morpholine for the piperidine. The compound has a boiling point of $b_2$ 231° C.

EXAMPLE 11

N-[p-(4-methoxybenzyl)-phenylpropyl]-morpholine

A mixture of 773 parts of γ-phenylpropyl chloride, 60 parts of paraformaldehyde and 60 parts of anhydrous zinc chloride is vigorously stirred for about 30 minutes under heating to 75° C. Subsequently, dry HCl is introduced at 50° C. under further stirring into the mixture. The HCl is dissolved quickly and practically completely until saturation. After saturation, the mixture is stirred for an additional hour, the reaction product separated from the aqueous phase is diluted with a small amount of ether, successively washed with water, sodium bicarbonate solution and again with water, dried over calcium chloride and finally subjected to fractional distillation. In the latter, in addition to unchanged phenylpropyl chloride, which has been used here in great excess, 287 parts of p-chloromethyl-γ-phenylpropyl chloride having a boiling point of $b_{10}$ 149°–150° C. are obtained. The yield amounts to about 80% of the theory, based on the reacted amount of γ-phenylpropyl chloride.

40.6 parts of the chloromethylation product thus obtained are introduced drop by drop during 20 minutes at 100° C. into a mixture of 65 parts of anisol and 0.022 part of $FeCl_3$, while dry air is passed through the reaction mass. Within 35 minutes the theoretical amount of HCl is split off, whereupon the reaction product is diluted with a small amount of ether and washed successively with dilute hydrochloric acid, water, sodium bicarbonate solution and again with water. The product is then dried over calcium chloride and subjected to fractional distillation. Thereby, the p-(4-methoxybenzyl)-phenylpropyl chloride boils at 185° C. under a pressure of 15 Torr. The yield amounts to 75% of the theory. By reacting this chloride with an about equal amount of morpholine at 125° C. and processing the reaction product in the manner described in connection with the isolation of N-(p-benzyl-phenylpropyl)-piperidine in the above Example 1, N-[p-(4-methoxyphenyl)-phenylpropyl]-morpholine of 92% purity, having a boiling point of $b_3$ 239–240° C. are obtained.

EXAMPLE 12

N-[p-(4-methoxy-3-chlorobenzyl)-phenylpropyl]-morpholine 86 parts of o-chloroanisol are reacted with 40.6 parts of p-(chloromethyl)-γ-phenylpropyl chloride with the addition of 0.012 part of $FeCl_3$. This dichloride is prepared in the present as well as in all of the subsequent examples, in the manner described in the preceding Example 11. In the reaction of the dichloride with o-chloroanisol, the theoretical amount of the HCl is formed at 100° C. within 20 minutes. The further treatment, which is carried out in the manner described in the preceding example, yields 78% of p-(4-methoxy-3-chlorobenzyl)-phenylpropyl chloride having a boiling point of $b_{1.3}$ 213° C. By reacting this chloride in conventional manner (as described in Example 11) with morpholine, 90% of the compound N-[p-(4-methoxy-3-chlorobenzyl)-phenylpropyl]-morpholine having a boiling point of $b_{1.2}$ 242° C. are obtained.

EXAMPLE 13

N-[p-(4-butoxy-3-methylbenzyl)-phenylpropyl]-morpholine 148 parts of o-butoxytoluene are reacted at 145° C. with 61 parts of p-(chloromethyl)-γ-phenylpropyl chloride, in the presence of $FeCl_3$ as catalyst, in the manner described in the above Example 11. An amount of 15 parts of the p-(4-butoxy-3-methylbenzyl)-phenylpropyl chloride (having a boiling point of $b_{1.6}$ 217°–219° C.) thus formed, are reacted in the manner described in the above Example 12, with 12 parts of morpholine. Thereby, N-[p-(4-butoxy-3-methylbenzyl)-phenylpropyl]-morpholine is formed in a yield of about 60% based on the amount of reacted phenylpropylchloride. The compound has a boiling point of $b_{1.8}$ 245°–246° C.

EXAMPLE 14

N-[p-(4-phenoxybenzyl)-phenylpropyl]-morpholine

In the preparation of this product, the diphenyl ether is reacted in a manner similar to that described in connection with anisol in Example 11. This procedure yields pure N-[p-(4-phenoxybenzyl)-phenylpropyl]-morpholine having a boiling point of $b_{1.1}$ 263°–265° C. The yield amounts in the catalytic reaction to about 80% and in the reaction of the chloride with morpholine to about 90% of the theory.

EXAMPLE 15

N-[p-thenylphenylpropyl]-morpholine

A solution of 50 parts of thiophene in 50 parts of nitrobenzene is reacted with the addition of 0.022 part of $FeCl_3$, in the manner described in the above Example 11, with 40.6 parts of p-(chloromethyl)-phenylpropyl chloride. In this reaction p-thenylphenylpropyl chloride is formed, which yields by conventional reaction with morpholine 93% of N-[p-thenylphenylpropyl]-morpholine having a boiling point of $b_{1.3}$ 213°–214° C.

EXAMPLE 16

N-[p-(5-chlorothenyl)phenylpropyl]-morpholine

The chlorothiophene is reacted with p-(chloromethyl)-phenylpropyl chloride without the use of the nitrobenzene solvent, but otherwise in the manner described in the preceding Example 15. The N-[p-(5-chlorothenyl)-phenylpropyl]-morpholine, which is obtained in good yield, boils at 216°–218° C. at 1.6 Torr.

EXAMPLE 17

N-[p-(5-chlorothenyl)-phenylpropyl]-piperidine

By replacing in preceding Example 16 the morpholine by piperidine, N-[p-5-chlorothenyl)-phenylpropyl]piperidine having a boiling point of $b_{0.7}$ 198°–200° C., is obtained in a similar manner and in likewise good yield.

EXAMPLE 18

N-[p-(4-methoxybenzyl)-phenylethyl]-morpholine

Phenylethyl chloride is chloromethylated in a manner analogous to that described in connection with phenylpropyl chloride in the above Example 11. 38 parts of the resulting p-(chloromethyl)-phenylethyl chloride (boiling point $b_{13}$ 145–147° C.) are reacted at 100° C. with 65 parts of anisol in the presence of 0.020 part of $Fe_2O_3$ or $FeCl_3$. The reaction, which takes place within a rather short time, yields by proceeding in a manner corresponding to that described in the above Example 11, pure p-(4-methoxybenzyl)-phenylethyl chloride having a boiling point of $b_{1.6}$ 185°–186° C. Fifteen parts of this compound are reacted with an equal amount of morpholine. By conventional procedure, 16.5 parts (=92% of the theory) of pure N-[p-(4-methoxybenzyl)-phenylethyl]-morpholine having a boiling point of $b_1$ 218° to 220° C. are obtained.

EXAMPLE 19

N-[p-thenyl-phenylethyl]-morpholine

By replacing in the above Example 15 the p-(chloromethyl)-phenylpropyl chloride by an equal amount of p-(chloromethyl)-phenylethyl chloride and proceeding otherwise in the manner described in said example, the compound N-[p-thenyl-phenylethyl]-morpholine having a boiling point $b_{12}$ 198°–200° C. is obtained in good yield as the end product.

EXAMPLE 20

N-[p-thenyl-phenylethyl]-piperidine

This compound is obtained in good yield by replacing in the reactions according to the preceding Example 19, the morpholine by an equal amount of piperidine. It has a boiling point of $b_{1.5}$ 195°–197° C.

EXAMPLE 21

N-[p-(3,4-dimethoxybenzyl)-phenylpropyl]-morpholine

By replacing in the reactions described in the above Example 12 the o-chloroanisol by an equal amount of veratrole, the pure compound N-[p-(3,4-dimethoxybenzyl)-phenylpropyl]-morpholine having a boiling point of $b_{0.6}$ 232°–234° C. is obtained. The yield amounts to 60% of the theory, based on the amount of reacted 4-(chloromethyl)-phenylpropyl chloride.

EXAMPLE 22

N-[p-(2,4,6-trimethylbenzyl)-phenylpropyl]-morpholine

By replacing in the reactions described in the above Example 12 the o-chloroanisol by an equal amount of mesitylene, the compound N[p-(2,4,6-trimethyl-benzyl)-phenylpropyl]-morpholine having a boiling point of $b_{1.7}$ 233°–235° C. results, in a yield of about 60%.

EXAMPLE 23

N-(p-thenyl-phenylpropyl)-morpholine 50 parts of thiophene are reacted at 100° C. with 40.6 parts of p-(chloromethyl)-phenylpropyl chloride, in the presence of 0.025 part of zinc chloride as catalyst. 12 parts of the resulting p-thenyl-phenylpropyl chloride are reacted in conventional manner with 12.5 parts of morpholine, whereby 93% of the compound N-(p-thenyl-phenylpropyl)-morpholine having a boiling point of $b_{1.3}$ 213–214° C., are obtained.

EXAMPLE 24

N-[p-(4-phenoxybenzyl)-phenylpropyl]-morpholine

This compound can be prepared in satisfactory manner by the ingredients and the procedure described in the above Example 14, also if the 0.022 part of $FeCl_3$ is replaced by 0.01 part of $AlCl_3$ as catalyst in said procedure.

EXAMPLE 25

N-[p-(4-fluorobenzyl)-phenylpropyl]-piperidine

This compound, which has a boiling point of $b_{1.5}$ 193°–194° C., is obtained with a yield of 90% of the theory, by reacting in conventional manner 14.6 parts of piperidine with 15 parts of p-(4-fluorobenzyl)-phenylpropyl chloride, which has a boiling point of $b_{1.3}$ 160°–161° C. This dihalogenide is prepared by reacting 4-fluorobenzyl chloride with γ-phenylpropyl chloride in a manner similar to that of the treatment of 4-chloro-benzyl chloride, described in the above Example 2. The p-(4-fluorobenzyl)-phenylpropyl chloride can be also obtained by reacting 71 parts of fluorobenzene with 30.5 parts of p-(chloromethyl)-phenylpropyl chloride at 90° C. in the presence of 0.19 part of $AlCl_3$ as catalyst.

EXAMPLE 26

N-(p-benzylphenylpropyl)-piperidine

In addition to benzylchloride, as described in Example 1, the above compound can be prepared also from benzene in the following manner.

90 parts of benzene are reacted with 30.5 parts of p-(chloromethyl)-phenylpropyl chloride in the presence of 0.11 part of $AlCl_3$ in conventional manner. The resulting p-benzylphenylpropyl chloride is then reacted at 125° C. with an equal amount of piperidine.

In the present application the parts and percent refer to parts and percent by weight, if not otherwise stated. In the statement of boiling points, the pressure, if different from one atmosphere, is indicated by a subscript; for example $b_{10}$ 200° means "boils at 200° if the pressure is 10 mm. Hg." The term "Torr." is a unit of pressure equal to $1/760$ of one normal atmospheric pressure.

It will be understood that the present invention is not limited to the specific materials, proportions, solvents, conditions and other details specifically described above and can be carried out with various modifications without departing from the scope of the invention, as defined in the appended claims. The catalysts are used in about the range of the proportions described above. Instead of the compounds of Fe, Zn and Al specifically described above, other compounds of these metals can also be used. The terms aryl and thienyl radicals are used in the present application to also include substituted aryl and substituted thienyl radicals.

What is claimed is:

1. A new compound corresponding to the general formula

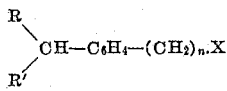

wherein R stands for a radical selected from the group consisting of phenyl, 4-fluorophenyl, 4-chlorophenyl, 4-methoxyphenyl, 4-butoxyphenyl, 4-phenoxyphenyl, 4-methoxy-3-chlorophenyl, 3,4-dimethoxyphenyl, 2,4,6-trimethylphenyl, thienyl and 5-chlorothienyl radicals; R' is selected from the group consisting of H and —$CH_3$; X is selected from the group consisting of morpholine and piperidine radicals and n is an integer having a value in the range of 2–4.

2. As a new compound N-(p-benzylphenylpropyl)-morpholine.

3. As a new compound N-[p-(4-chlorobenzyl)-phenylpropyl]-morpholine.

4. As a new compound N-[p-(α-phenylethyl)-phenylethyl]-morpholine.

5. As a new compound N-[p-(4-methoxybenzyl)-phenylpropyl]-morpholine.

6. As a new compound N-[p-(5-chlorothenyl)-phenylpropyl]-morpholine.

7. A process for preparing a compound corresponding to the general formula

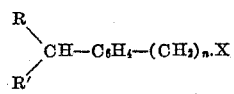

wherein R stands for a radical selected from the group consisting of phenyl, 4-fluorophenyl, 4-chlorophenyl, 4-methoxyphenyl, 4-butoxyphenyl, 4-phenoxyphenyl, 4-methoxy-3-chlorophenyl, 3,4-dimethoxyphenyl, 2,4,6-trimethylphenyl, thienyl and 5-chlorothienyl radicals; R' is selected from the group consisting of H and —$CH_3$; X is selected from the group consisting of morpholine and piperidine radicals and n is an integer having a value in the range of 2–4, comprising substituting in a phenylalkyl halogenide of the general formula $C_6H_5$—$(CH_2)_n$-halogen, wherein n has the above defined meaning, an H atom of the phenyl radical by a radical selected from the group consisting of benzyl and thenyl radicals and subsequently reacting the resulting product with an amine in order to replace the halogen by an amine radical.

8. A process as claimed in claim 7, in which a compound of the formula $C_6H_5$—$(CH_2)_n$.Cl is reacted with a compound of the general formula

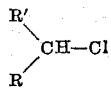

in the presence of a catalyst selected from the group consisting of the compounds of iron, zinc and aluminum, and used in a minimum amount within the range of 0.01–0.187% based on the total weight of the reaction components, and the resulting product is reacted with an amine selected from the group consisting of piperidine and morpholine in order to replace the Cl-atom by the radical of the amine.

9. A process as claimed in claim 7, in which a compound of the formula $C_6H_5$—$(CH_2)_n$Cl is subjected to chloromethylation to form a compound of the formula $Cl.CH_2$—$C_6H_4$—$(CH_2)_n$.Cl, the resulting product is reacted in the presence of a catalyst selected from the group consisting of compounds of iron, zinc and aluminum, and used in a minimum amount within the range of 0.01–0.0187% based on the total weight of the reaction components, with a compound of the formula R.H and the reaction product is treated with an amine selected from the group consisting of piperidine and morpholine in order to replace the Cl-atom by the radical of the amine.

No references cited.